United States Patent [19]

Morris et al.

[11] Patent Number: 5,085,709

[45] Date of Patent: * Feb. 4, 1992

[54] METHOD FOR TREATING NATURAL GAS EQUIPMENT

[75] Inventors: Richard L. Morris, Duncanville; James M. Paul, DeSoto, both of Tex.

[73] Assignee: Mobil Oil Corporation, Fairfax, Va.

[*] Notice: The portion of the term of this patent subsequent to Dec. 25, 2007 has been disclaimed.

[21] Appl. No.: 493,180

[22] Filed: Mar. 14, 1990

[51] Int. Cl.$^5$ ............................................. G21F 9/00
[52] U.S. Cl. ................................. 134/3; 134/22.14; 134/22.19; 134/29; 252/626
[58] Field of Search ............... 134/22.1, 22.11, 22.14, 134/22.19, 3, 29; 252/626

[56] References Cited

U.S. PATENT DOCUMENTS

| | | | |
|---|---|---|---|
| 2,877,848 | 3/1959 | Case | 166/42 |
| 3,660,287 | 5/1972 | Quattrini | 252/8.55 B |
| 3,951,827 | 4/1976 | Burroughs et al. | 252/8.55 B |
| 4,190,462 | 2/1980 | DeJong et al. | 134/2 |
| 4,215,000 | 7/1980 | DeJong et al. | 252/8.55 B |
| 4,276,185 | 6/1981 | Martin | 252/87 |
| 4,288,333 | 9/1981 | van Zon et al. | 252/8.55 B |
| 4,512,921 | 4/1985 | Anstine et al. | 252/626 |
| 4,708,805 | 11/1987 | D'Muhala | 210/698 |
| 4,980,077 | 12/1990 | Morris et al. | 134/3 |

*Primary Examiner*—Theodore Morris
*Assistant Examiner*—Saeed Chaudhry
*Attorney, Agent, or Firm*—Alexander J. McKillop; Charles J. Speciale; Malcolm D. Keen

[57] ABSTRACT

Natural gas processing equipment and sorption media such as charcoal, silica or alumina, contaminated with adherent scale deposits of alkaline earth metal sulfates may include radioactive components, especially radium sulfate and thorium sulfate, which render the equipment radioactive. The scale is removed from the processing equipment by washing with an aqueous chemical composition including a polyaminopolycarboxylic acid such as EDTA or DEPA as a chelant in combination with a synergist, preferably oxalate or monocarboxylate acid anion such as salicylate. The washing may be carried out with the equipment in place or by immersion of the equipment in a body of the solution in a suitable treatment tank.

19 Claims, No Drawings

METHOD FOR TREATING NATURAL GAS EQUIPMENT

CROSS REFERENCE TO RELATED APPLICATIONS

This application is related to the following co-pending patent applications:

| Ser. No. | Filing Date |
| --- | --- |
| 07/332,146 | 3 April 1989 |
| 07/369,897 | 22 June 1989 |
| 07/431,114 | 3 November 1989 |
| 07/484,970 | 26 February 1990 |
| | (Mobil Case 5710S) |

These prior applications are directed to the use of various chemical compositions for the removal of alkaline earth scale deposits from oilfield equipment and reference is made to these applications in this application for a description of these compositions.

This application is also related to Ser. No. 07/484,970, 26, Feb. 1990, which relates to the removal of precipitated mineral scale species from the earth layers surrounding production equipment.

BACKGROUND OF THE INVENTION

Natural gas is a major and attractive energy source in the United States and other countries which is distributed on a wide scale by means of pipelines to the ultimate users. The composition of natural gas at the wellhead varies widely from field to field and many components may need to be removed by processing before delivery to the pipeline, as noted in Encyclopedia of Chemical Technology, Kirk-Othmer, Third Edition, Vol. 1, pp. 630-652, John Wiley & Sons, New York, 1978. Condensate must be removed from wet gas, both to eliminate the possibility of condensation in the pipeline itself and to separate these components as another marketable product. Water vapor must also be removed to preclude the formation of gas hydrate and hydrogen sulfide is removed because of its poisonous and corrosive characteristics. Other components such as carbon dioxide and helium may also require removal if they are present.

A number of different processing techniques have been developed for the removal of specific contaminants in the gas and depending upon the composition of the wellhead gas, one or more of the specific processing techniques may be employed at any given gas production site. Water, for example, is generally removed either by absorption in a hydroscopic liquid or adsorption on an activated solid dessicant. Acid gases such as carbon dioxide, hydrogen sulfide and other sulfur compounds may be removed by processes such as the Sulfinol and Selexol processes or by alkali scrubbing, normally using an organic scrubbing agent such as monoethanolamine, diethanolamine or triethanolamine. Natural gas liquids may be recovered by oil absorption or, more recently, by the cryogenic turboexpander process.

Regardless of the specific processing sequence used to condition the gas for pipelining, it is normally passed through a number of items of process equipement prior to removal of the water which generally is present in all wellhead gas. Conventionally, the gas will pass through filters to remove entrained solid contaminants as well as compressors and other items of process equipment employed in the purification train. One problem which is encountered with these items of equipment which precede the water removal is that mineral species and other contaminants from the producing formations may be dissolved in or entrained with the water and may contaminate the equipment with which it comes into contact. Among the contaminants of this kind are dissolved salts including, especially, mineral species of low solubility which may deposit as scale on the filters and other surface equipment. Among the minerals of this kind which cause a particular problem are the sulfates of the alkaline earth metal, including, in particular, calcium, strontium and barium.

As these mineral species precipitate on the surfaces of the water-carrying or water-containing systems, they form adherent deposits or scale. Scale may prevent effective heat transfer, interfere with fluid flow, facilitate corrosive processes, or harbor bacteria. Scale is an expensive problem in many industrial water systems, in production systems for oil and gas, in pulp and paper mill systems, and in other systems, causing delays and shutdowns for cleaning and removal.

The scale deposits formed from the sulfates of the alkaline earth metals including barium and strontium present a unique and particularly intractable problem. Under most conditions, these sulfates are considerably less soluble in all solvents than any of the other commonly encountered scale-form ng compounds, as shown by the comparative solubilities given in Table 1 below.

TABLE 1

| Comparative Solubilities, 25° C. in Water. | |
| --- | --- |
| Scale | Solubility, mg./l. |
| Gypsum | 2080.0 |
| Strontium sulfate | 140.0 |
| Calcium Carbonate | 14.0 |
| Barium sulfate | 2.3 |

Barium sulfate scale is extremely difficult to remove chemically, especially within reasonably short periods of time: the solvents which have been found to work generally take a long time to reach an equilibrium concentration of dissolved barium sulfate, which itself is usually of a relatively low order. Consequently, barium sulfate must be removed mechanically or the equipment, e.g. pipes, etc., containing the deposit must be discarded.

Another problem associated with the formation of barium and strontium sulfate scales is that radium, another member of the alkaline earth group of metals, tends to be deposited at the same time in the form of an insoluble sulfate so that the equipment becomes radioactive, and may eventually become unusable for safety reasons alone. The principal isotopes of radium which have been identified in these scale deposits are radium-226 and radium-228, with half-lives of 1600 years and about 5.8 years, respectively, so that there is a considerable potential hazard if they are allowed to remain on the equipment. Radioisotopes of metals such as thallium and thorium e.g. thallium-208, thorium-232 and other radioactive isotopes—frequently formed by the decay of uranium—may also be deposited with the radium with the same result. This problem is encountered with gas processing equipment where the filters and dehydration media, including screens, sorbent beds and media e.g. silica, charcoal or alumina may become quite radioactive with extended use. Since these radioactive elements are embedded in the scale which itself can be removed only with difficulty, the decontamination of the equipment and material is a substantial problem.

SUMMARY OF THE INVENTION

We have now devised a method for the decontamination of gas handling equipment and media such as pipes, tubing, pumps, sorption media and vessels, which is effective and convenient for the removal of radioactive scales and deposited mineral species.

According to the present invention, deposits of insoluble, radioactive sulfate scale are removed from natural gas processing equipment by the use of a chemical composition which includes a chelant (chelating agent) in combination with a catalyst or synergist which increases the solubility of the alkaline earth metal sulfates in aqueous solution. The preferred catalyst or synergist is the oxalate anion as described in Ser. No. 07/369,897, but other synergists may also be used including the monocarboxylate acid synergists as described in Ser. No. 07/431,114 and the thiosulfate or nitriloacetic acid synergists disclosed in Ser. No. 07/484,970, 26 Feb. 1990.

DETAILED DESCRIPTION

Mineral deposits or scale derived from subterranean waters form on natural gas handling equipment and media such as pipework, tubing, pumps, filters, screens, and sorption media such as charcoal, silica, alumina beds, as the gas passes through them and the water evaporates or is removed in the processing. The scale deposits frequently include radioactive components, especially the insoluble sulfate of radium, an alkaline earth metal, and of related metals, including thorium and thallium. The scale deposits usually include additional mineral components, for example, the sulfates of the other metals of the alkaline earth group, especially calcium, strontium and barium, which are of low solubility in conventional solvents, as described above. Once they are formed, these scale deposits cannot be readily removed by conventional means since they are both adherent and insoluble to the conventional solvents. Thus, they cannot be readily removed by washing or other simple remedies. The deposits therefore accumulate progressively on the equipment and because many of them are radioactive because of the presence of the radioactive species, increase the activity of the equipment over a period of time until it may no longer be acceptable according to the relevant regulatory standards.

According to the present invention, deposits of scale on gas handling equipment and media which include water insoluble alkaline earth metal sulfates including radioactive contaminants such as radium sulfate, are removed by the use of a chemical composition which includes a chelant (chelating agent) in combination with a catalyst or synergist which increases the solubility of the alkaline earth metal sulfates in aqueous solution. The preferred catalyst or synergist is the oxalate anion as described in Ser. No. 07/369,897, but other synergists may also be used including the mono-carboxylate acid synergists as described in Ser. No. 07/431,114 and the thiosulfate or nitriloacetic acid synergists disclosed in Ser. No. 07/484,970 (Case 5710S). Reference is made to these applications for a description of suitable aqueous solvent compositions which may be used for the removal of these scale deposits according to the methods disclosed in this present application. Any of the scale removal compositions disclosed in the related applications identified above, together with other suitable compositions having the same or similar effect may be used in the present techniques and will be more or less preferred according to their effectiveness.

The aqueous solvent composition which is used to remove the scale material from the earth comprises a polyaminopolycarboxylic acid such as ethylenediaminetetraacetic acid (EDTA) or diethylenetriaminepentaacetic acid (DTPA) as a chelant or chelating agent which is intended to form a stable complex with the cation of the alkaline earth scale-forming material. Of these chelants, DTPA is the preferred species since it forms the most soluble complexes at greatest reaction rate. EDTA may be used but is somewhat less favorable and, as noted below, may be less responsive to the addition of the catalyst or synergist. The chelant may be added to the solvent in the acid form or, alternatively, as a salt of the acid, preferably the potassium salt. In any event the alkaline conditions used in the scale removal process will convert the free acid to the salt.

The concentration of the chelant in the solvent should normally be at least 0.1M in order to achieve acceptable degree of scale removal. Chelant concentrations in excess of 1.0M are usually not necessary and concentrations from about 0.3M up to about 0.6M will normally give good results; although higher concentrations of chelant may be used, there is generally no advantage to doing so because the efficiency of the chelant utilisation will be lower at excess chelant concentrations.

In addition to the chelant, the scale removal compositions contain a catalyst or synergist for the dissolution of the scale. As described in the applications referred to above, the synergist is preferably the oxalate anion, a monocarboxylic anion such as mercaptoacetate, hydroxyacetate or aminoacetate or an aromatic acid, preferably salicylate, or thiosulfate or nitriloacetate. Generally these anions are added as salts or the free acid, depending on the stability and availability of the chosen synergist. In either case, however, the relatively alkaline conditions under which the process is operated, will result in the acid, if used, being converted to the salt form. The potassium salts are preferred in view of their greater solubility and for this reason, the solvent should preferably be brought to the desired pH value with a potassium base, preferably potassium hydroxide.

The pH of the solvent is adjusted by the addition of a base, preferably potassium hydroxide, to the desired value, permitting scale removal to take place under alkaline conditions preferably at pH values of from about 8.0 to about 14.0, with optimum values being from about 11 to 13, preferably about 12. As noted above, the use of caustic potash is preferred to bring the composition to the desired pH since the potassium salts formed by its use are more soluble than the corresponding sodium salts: it is important to avoid the use of sodium cations when operating at high pH values, above pH 8, and instead, to use potassium or, alternatively, cesium as the cation of the scale-removing agent. Potassium is preferred for economy as well as availability. Thus, the normal course of making up the solvent will be to dissolve the chelant and the potassium salt of the selected synergist in the water to the desired concentration, after which a potassium base, usually potassium hydroxide is added to bring the pH to the desired value of about 12.

The concentration of the catalyst or synergist in the aqueous solvent will be of a similar order to that of the chelant: thus, the amount of the synergist anion in the solvent should normally be at least 0.1M in order to achieve a perceptible increase in the efficiency of the scale removal, and concentrations from about 0.3M up to about 0.6M will give good results. Although higher concentrations of the synergist e.g. above 1.0M may be used, there is generally no advantage to doing so because the efficiency of the process will be lower at excess catalyst concentrations. Again, this economic penalty is particularly notable in oilfield operations.

In the preferred scale removal compositions, a polyaminopolycarboxylic acid such as ethylenediaminetetraacetic acid (EDTA) or diethylenetriaminepentaacetic acid (DTPA) is used as the chelant, preferably in an amount of 0.1 to 1.0M as the chelant, typically about 0.5M giving good results. The preferred synergist or catalyst is the oxalate anion, as disclosed in Ser. No. 07/369,897. The oxalate is preferably used in an amount of about 0.1 to 1.0M, preferably about 0.5M, with a pH of 10 to 14, preferably 11 to 13, and usually about 12. The desired pH value is obtained by the addition of a base, preferably a potassium base such as caustic potash, potassium hydroxide. If the chelant is added in the form of a salt, the preferred cations for the salt will be potassium since these have been found to give better solubility. An alternative synergist or catalyst is a monocarboxylic acid anion, as described in Ser. No. 07/431,114, preferably salicylate. These anions have also been found to give fast rates of sulfate scale dissolution and are able to take up a high level of sulfate scale into solution so that they represent a particularly favored method of decontaminating has handling equipment and media. The thiosulfate or nitriloacetic acid synergists described in Ser. No. 07/484,970 Case 5107S) may also be used, as described in that application. The amounts of the chelant and synergist used with the moncarboxylic acid and other synergists are comparable to the amounts used with the oxalate synergists and comparable solution pH values are also used, i.e chelant and synergist concentrations from 0.1 to 10M, usually about 0.5M, solution pH from 10 to 14, usually 11 to 13 and for best results, about 12.

The scale removal composition may be heated to a temperature between about 25° C. to about 100° C. (or higher if superatmospheric pressure can be employed), in order to improve the dissolution of the insoluble scale species in the composition. Contact time between the equipment and the scale-removing composition is typically from about ten minutes to about 7 hours, depending on the thickness of the scale deposits and the temperature, with faster dissolution of the scale being obtained at the higher temperatures. After remaining in contact with the equipment for the desired time, the composition containing the dissolved scale may be drained off and, if desired, recovered for removal of the dissolved scale species.

In the treatment of the equipment and sorption media, the mineral deposits may be removed by washing with the selected solvent. The equipment may, if convenient, be washed with the solvent while still in place or, alternatively, removable items such as filters and minor pieces may be removed and washed with the solvent in a tank. Sorption media such as charcoal, alumina or silica, which are particulate in character, may be slurried with the solution after being unloaded from the sorption vessel or, alternatively, they may be treated in situ in the vessel if the loading of the medium and the mechanical features of the vessel permit this to be done. In either case, contact time will vary according to the thickness of the scale but at treatment temperatures of about 25° to 100° C., the duration of the treatment will normally be about 1 to 6 hours to reduce the radioactivity to acceptable levels. The solvent containing the dissolved scale components may then be treated to recover the dissolved radioactive materials for acceptable disposal methods, for example, by cation exchange onto a suitable cation-exchange resin to bring the radioactive components into solid form.

EXAMPLE

Samples were taken of a charcoal gas sorption medium, which had become contaminated with radium-226, thallium-208 and thorium 232. The samples contained these contaminants, accumulated over extended periods of time in gas processing, in amounts which precluded their disposal by normal methods. The activity was 24.9 pCi/g.(picocuries/gram.) for the radium component.

The charcoal samples were slurried with an aqueous solution of 0.5M DTPA (diethylenetriamine pentaacetic acid) and 0.5M oxalic acid brought to pH=12 by the addition of caustic potash (potassium hydroxide). the slurry was held at a temperature of 90°–100° C. for approximately four hours, after which the charcoal was filtered off and dried. After drying, the activity of the samples was found to be 0.3 pCi/g.(radium-226), low enough to permit disposal of the charcoal by conventional methods.

What is claimed is:

1. A method of decontaminating natural gas processing equipment and media having adherent mineral deposits of alkaline earth metal sulfates containing radioactive components, which method comprises (i) converting the alkaline earth metal sulfates in the deposit to soluble form by contacting the deposit with an aqueous composition comprising a chelating agent and a synergist at a pH from 10 to 13, to dissolve the deposit in the composition and remove it from the equipment.

2. A method according to claim 1 in which the removal composition comprises a polyaminopolycarboxylic acid as the chelating agent.

3. A method according to claim 2 in which the removal composition comprises ethylenediaminetetraacetic acid (EDTA) as the polyaminopolycarboxylic acid chelating agent.

4. A method according to claim 2 in which the removal composition comprises diethylenetriaminepentaacetic acid (DTPA) as the polyaminopolycarboxylic acid chelating agent.

5. A method according to claim 2 in which the removal composition comprises a polyaminopolycarboxylic acid as the chelating agent and oxalate anion as a synergist.

6. A method according to claim 5 in which the chelating agent comprises DTPA in a concentration of from 0.1M to 1.0M.

7. A method according to claim 6 in which the synergist comprises oxalate anion in a concentration of from 1.0M to 1.0M.

8. A method according to claim 7 where the pH of the solution is from 11 to 13.

9. A method according to claim 8 in which the scale is contacted with the composition at a temperature from 25° C. to 100° C.

10. A method according to claim 2 in which the aqueous solution comprises a polyaminopolycarboxylic acid as the chelating agent and a monocarboxylic acid anion as the synergist.

11. A method according to claim 6 in which the monocarboxylic anion is selected from hydroxyacetate, mercaptoacetate and aminoacetate.

12. A method according to claim 6 in which the monocarboxylic acid anion comprises salicylate anion.

13. A method according to claim 2 in which the aqueous solution comprises a polyaminopolycarboxylic acid as the chelating agent and a synergist selected from thiosulfate and nitriloacetate anions.

14. A method according to claim 1 in which the pH of the composition is about 12.

15. A method according to claim 1 in which the composition is brought to the specified pH by the addition of a potassium base.

16. A method according to claim 15 in which the potassium is potassium hydroxide.

17. A method according to claim 1 in which the sulfate scale contains radium.

18. A method according to claim 1 in which a particulate gas sorption medium is contacted with the composition.

19. A method according to claim 18 in which the gas sorption medium comprises charcoal, silica or alumina.

* * * * *